(12) United States Patent
Sorkin

(10) Patent No.: US 9,493,951 B2
(45) Date of Patent: Nov. 15, 2016

(54) DUCT COUPLER FOR POST-TENSIONED CONCRETE MEMBER

(71) Applicant: Felix Sorkin, Stafford, TX (US)

(72) Inventor: Felix Sorkin, Stafford, TX (US)

( * ) Notice: Subject to any disclaimer, the term of this patent is extended or adjusted under 35 U.S.C. 154(b) by 30 days.

(21) Appl. No.: 14/548,752

(22) Filed: Nov. 20, 2014

(65) Prior Publication Data
US 2015/0330544 A1 Nov. 19, 2015

Related U.S. Application Data

(60) Provisional application No. 62/000,373, filed on May 19, 2014.

(51) Int. Cl.
*E04C 5/00* (2006.01)
*F16L 21/00* (2006.01)

(52) U.S. Cl.
CPC ............. *E04C 5/00* (2013.01); *F16L 21/002* (2013.01)

(58) Field of Classification Search
CPC .............. F16L 21/06; F16L 21/002; F16L 21/08; F16L 21/03
See application file for complete search history.

(56) References Cited

U.S. PATENT DOCUMENTS

| | | | | |
|---|---|---|---|---|
| 4,456,288 A * | 6/1984 | Conner | .................... | F16L 21/08 285/321 |
| 4,643,466 A * | 2/1987 | Conner | ................. | F16L 37/092 285/321 |
| 4,648,633 A * | 3/1987 | Bergmann | .............. | F16L 21/08 285/337 |
| 4,836,580 A | 6/1989 | Farrell | | |
| 5,078,432 A * | 1/1992 | Seiter | ...................... | F16L 39/00 285/124.3 |
| 5,137,306 A * | 8/1992 | Flood | ...................... | F16L 39/04 285/123.2 |
| 5,356,181 A | 10/1994 | Shirogane et al. | | |
| 5,474,335 A | 12/1995 | Sorkin | | |
| 5,775,849 A | 7/1998 | Sorkin | | |
| 5,921,592 A * | 7/1999 | Donnelly | .............. | F16L 37/091 285/131.1 |

(Continued)

OTHER PUBLICATIONS

International Search Report and Written Opinion issued in International Application No. PCT/US14/66571, dated Feb. 25, 2015 (12 pages).

*Primary Examiner* — Rodney Mintz
(74) *Attorney, Agent, or Firm* — Adolph Locklar

(57) ABSTRACT

An embodiment is directed to a duct coupler for joining two segments of conduit. The duct coupler includes a coupler body. The coupler body is generally tubular and has an inner diameter generally corresponding to the outer diameter of a section of conduit measured at an annular locking rib positioned on the section of conduit. The duct coupler further includes one or more protrusions formed on the interior surface of the coupler body. Each protrusion is generally wedge shaped. The one or more protrusions are positioned to engage with at least one annular locking rib to retain the section of conduit within the coupler body. The duct coupler further includes a body gasket. The body gasket is generally tubular and positioned on the interior surface of the coupler body. The body gasket is positioned to form a seal between the inner wall of the coupler body and the outer wall of the section of conduit.

17 Claims, 4 Drawing Sheets

(56) References Cited

U.S. PATENT DOCUMENTS

| | | | |
|---|---|---|---|
| 5,954,373 A | 9/1999 | Sorkin | |
| 6,425,608 B1* | 7/2002 | Nordstrom | F16L 21/08 285/260 |
| 6,550,816 B1 | 4/2003 | Sorkin | |
| 6,659,135 B2 | 12/2003 | Sorkin | |
| 6,676,173 B2* | 1/2004 | Donnelly | F16L 21/002 285/373 |
| 6,752,435 B1 | 6/2004 | Sorkin | |
| 6,764,105 B1 | 7/2004 | Sorkin | |
| 6,773,039 B2 | 8/2004 | Muenster et al. | |
| 6,834,890 B2 | 12/2004 | Sorkin | |
| 6,843,031 B1 | 1/2005 | Sorkin | |
| 6,874,821 B1 | 4/2005 | Sorkin | |
| 6,889,714 B1 | 5/2005 | Sorkin | |
| 7,267,375 B1 | 9/2007 | Sorkin | |
| 7,273,238 B1 | 9/2007 | Sorkin | |
| 7,621,103 B1 | 11/2009 | Sorkin | |
| 7,686,347 B1 | 3/2010 | Sorkin | |
| 7,695,021 B1 | 4/2010 | Sorkin | |
| 8,016,326 B1 | 9/2011 | Sorkin | |
| 8,398,123 B1 | 3/2013 | Sorkin | |
| 8,640,292 B1 | 2/2014 | Sorkin | |
| 2003/0098586 A1* | 5/2003 | Donnelly | F16L 21/002 285/373 |
| 2007/0252389 A1 | 11/2007 | Milici et al. | |
| 2010/0301596 A1 | 12/2010 | Amann et al. | |
| 2012/0298248 A1 | 11/2012 | Schwager et al. | |

\* cited by examiner

DUCT COUPLER FOR POST-TENSIONED CONCRETE MEMBER

CROSS-REFERENCE TO RELATED APPLICATIONS

This application is a nonprovisional application which claims priority from U.S. provisional application No. 62/000,373, filed May 19, 2014, which is incorporated by reference herein in its entirety.

TECHNICAL FIELD/FIELD OF THE DISCLOSURE

The present disclosure relates generally to a conduit coupling device. The present disclosure relates more specifically to a duct coupler for providing a water-tight joint between adjacent sections of conduit.

BACKGROUND OF THE DISCLOSURE

Structural concrete, though capable of carrying very high compressive loads, is generally weak in carrying tensile loads on its own. Reinforced concrete ameliorates this deficiency by including an internal structure formed from materials capable of withstanding tensile forces within an otherwise solid concrete structure. Metal bars or cables are often used due to their high tensile strength and relative ease of manufacture.

In order to further improve the tensile capacities of reinforced concrete structures, the reinforcement structure may be pre- or post-tensioned. Added structural tension maintains a compression loading on the concrete member, even when tensile stress would otherwise occur (such as in beam-loading).

In post-tensioned concrete, the reinforcing structure is tensioned after the concrete has set. In one form of post-tensioned concrete, a series of conduits are placed within the concrete form, each positioned parallel to the desired tensile pre-loading. The conduits are threaded with the one or more tensile members, such as metal cables. After the concrete has set, the metal cables may then be placed under tension, and anchored to either end of the conduit, thus placing the concrete member under tensile loading.

SUMMARY

An embodiment is directed to a duct coupler for joining two segments of conduit. The duct coupler may include a coupler body. The coupler body is generally tubular and has an inner diameter generally corresponding to the outer diameter of a section of conduit measured at an annular locking rib positioned on the section of conduit. The duct coupler may further include one or more protrusions formed on the interior surface of the coupler body. Each protrusion may be generally wedge shaped. The one or more protrusions are positioned to engage with at least one annular locking rib to retain the section of conduit within the coupler body. The duct coupler may further include a body gasket. The body gasket is generally tubular and positioned on the interior surface of the coupler body. The body gasket is positioned to form a seal between the inner wall of the coupler body and the outer wall of the section of conduit.

Another embodiment is directed to a conduit for use in a post-tensioned concrete member. The conduit may include a first and second conduit section. The first and second conduit sections are generally tubular and have a series of annular locking ribs positioned along the length of each conduit section. The annular locking ribs have a diameter greater than the diameter of the conduit section. The conduit may further include a duct coupler positioned to couple the first conduit section to the second conduit section. The duct coupler may include a coupler body. The coupler body is generally tubular and has an inner diameter generally equal to or slightly greater than the diameter of the annular locking ribs. The duct coupler may further include one or more protrusions formed on the interior surface of the coupler body. Each protrusion may be generally wedge shaped. The one or more protrusions are positioned to engage with at least one annular locking rib to retain the conduit sections within the coupler body. The duct coupler also may include a body gasket. The body gasket is generally tubular and positioned on the interior surface of the coupler body. The body gasket is positioned to form a seal between the first and second conduit sections.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1A:
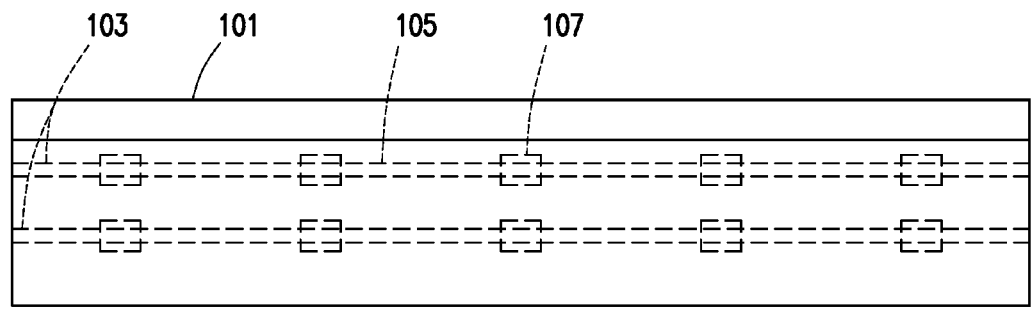
FIGS. 1A, 1B are side and end elevation views respectively of a concrete member formed in accordance with embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1B:
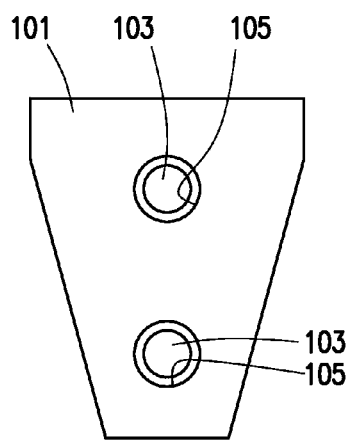

FIGS. 1A, 1B depict post-tensioned concrete member 101 having at least one post tensioning duct 103 formed integrally therein. Post tensioning duct 103 (FIGS. 1A, 1B depict two such post-tensioning ducts 103) may be formed integrally within the concrete structure of post-tensioned concrete member 101 by pouring concrete around conduit 105. Conduit 105 may be formed as a continuous tube made up of a series of conduit sections 107, joined end to end by duct couplers 109, for instance, as those shown in FIGS. 2, 3, and 4. Duct couplers 109 may, for example, structurally connect conduit sections 107 as well as form a seal to prevent concrete and other fluids from entering the interior of conduit 105. Conduct 105 may be piping, duct, or any other appropriate material for use in post-tension concrete.

At least one tensioning member such as, for example, a metal cable (not shown) is threaded through conduit 105. The metal cable may later be placed under tension after the concrete has been poured. An anchor may be affixed to each end of the metal cable to hold it under tension.

Figure 2:
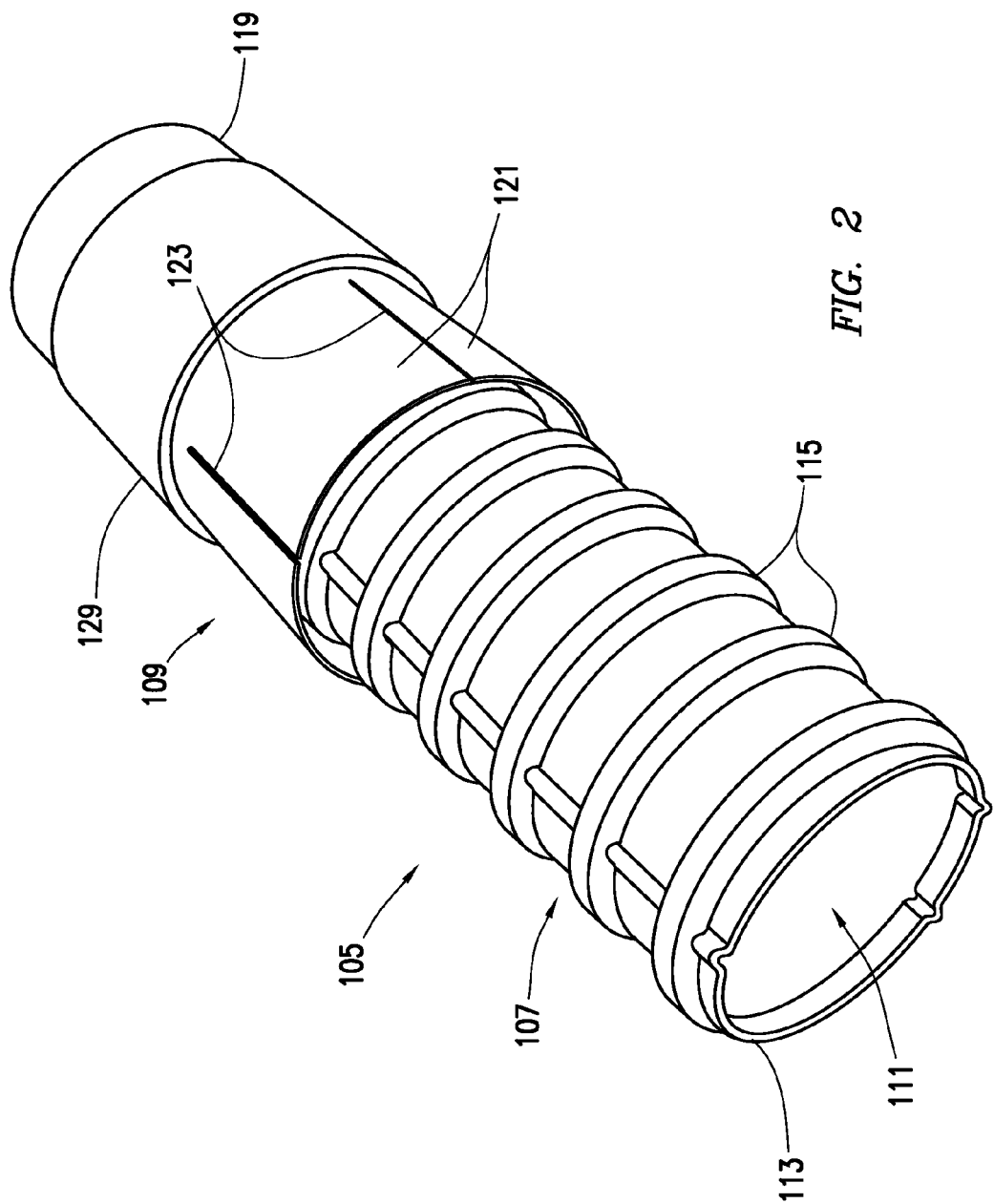
FIG. 2 is an isometric view of a duct coupler in accordance with embodiments of the present disclosure having a section of conduit inserted thereinto.

FIG. 2 depicts an isometric view of a conduit section 107 of conduit 105 positioned within duct coupler 109. Conduit section 107 is formed as a tubular member having an inner bore 111. Wall 113 of conduit section 107 may include a series of locking ribs 115 spaced along the length of conduit section 107. Here, locking ribs 115 are depicted as formed integrally within wall 113 of conduit section 107. One having ordinary skill in the art with the benefit of this disclosure will understand that although depicted as having a circular cross section, conduit section 107 may have any shaped cross section including, for example and without limitation, an ovoid, oblong, rectangular, or circular cross section.

Figure 3:
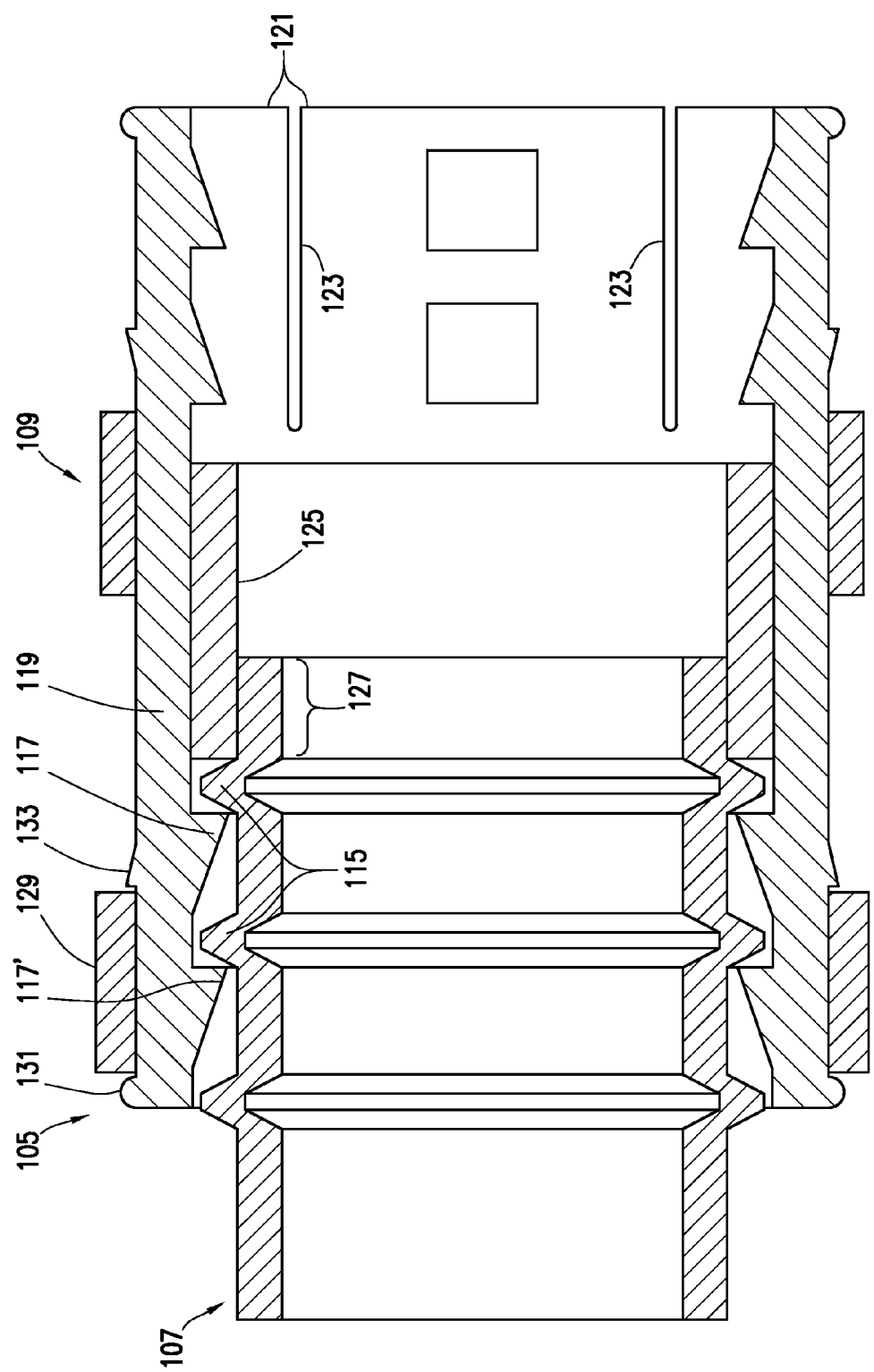
FIG. 3 is a cross-sectional view of the duct coupler of FIG. 2.

Duct coupler 109 is a tubular member having an interior diameter (ID) generally commensurate with the outer diameter (OD) of conduit section 107. Duct coupler 109 is formed to accept a conduit section 107 into each of its ends to form an end-to-end connection between the conduit sections. As depicted in FIG. 3, duct coupler 109 is coupled to conduit section 107 by inserting conduit section 107 into one end of duct coupler 109. In some embodiments, such as discussed herein, duct coupler 109 is symmetrical and accepts a conduit section 107 at either end. For simplicity's sake, only one end of duct coupler 109 will be described, but one having ordinary skill in the art with the benefit of this disclosure will understand that the other end of duct coupler 109 may work in an identical manner.

Duct coupler 109 may include one or more protrusions 117 spaced radially about the interior of duct coupler body 119. One or more protrusions 117 are positioned to latch onto a corresponding locking rib 115 of conduit section 107. One or more protrusions 117 may be generally wedge-shaped, so as to allow conduit section 107 to more easily enter duct coupler 109 and prevent its removal therefrom. In certain embodiments, one or more protrusions 117 extend partially about the perimeter of the interior of duct coupler body 119. When the number of protrusions 117 is more than one, the protrusions may extend in a row about the perimeter of the interior of duct coupler body 119. In other embodiments, wherein the number of protrusions is one, protrusion 117 may extend around the entire perimeter of the interior of duct coupler body 119.

In some embodiments, conduit section 107 may include multiple locking ribs 115. In some embodiments, duct coupler 109 may be installed onto an end of conduit section 107 cut from a longer section of conduit having multiple locking ribs disposed on the outer surface thereof. In such embodiments, protrusions 117 may be adapted to latch onto a locking rib 115 most proximate to the cut end of conduit section 107. One or more protrusions 117 may be generally wedge-shaped, so as to allow conduit section 107 to more easily enter duct coupler 109 and prevent its removal therefrom. In certain embodiments, one or more protrusions 117 extend partially about the perimeter of the interior of duct coupler body 119. When the number of protrusions 117 is more than one, the protrusions may extend in a row about the perimeter of the interior of duct coupler body 119. In other embodiments, wherein the number of protrusions is one, protrusion 117 may extend around the entire perimeter of the interior of duct coupler body 119.

In some embodiments, as depicted in FIG. 2, protrusions 117 may be positioned on cantilevered segments 121 formed in wall 119 of duct coupler 109. Cantilevered segments 121 may be adapted to elastically flex outward as locking rib 115 passes over protrusions 117 allowing for insertion of conduit section 107 into duct coupler 109. In some embodiments, cantilevered segments 121 may be formed by including grooves 123 in wall 119 of duct coupler 109. One having ordinary skill in the art with the benefit of this disclosure will understand that cantilevered segments 121 may be formed in other arrangements without departing from the scope of this disclosure.

As depicted in FIG. 3, duct coupler 109 may include body gasket 125. Body gasket 125 is formed as a generally annular segment on the interior surface of duct coupler body 119. Body gasket 125 may be attached to duct coupler body 119 by, for example, an adhesive such as epoxy, cyanoacrylate cement, etc. Body gasket 125 may have an inner diameter (ID) smaller than the outer diameter (OD) of conduit section 107, larger than the OD of conduit section 107, or about the same as the OD of conduit section 107. The OD of conduit section 107 may be measured at any point on the outer surface of conduit section 107, such as between locking ribs 115 or at one of locking ribs 115. Upon insertion of conduit section 107 into duct coupler 109, overhang section 127 of conduit section 107 may be press-fit into body gasket 125 to form a seal between the outer surface of overhang section 127 and body gasket 125. In some embodiments, the seal may be substantially air and/or liquid tight, preventing or reducing fluid penetration into the duct. In some embodiments, the seal may provide sufficient sealing without being completely or permanently liquid tight. Additionally, the press fit of overhang section 127 and body gasket 125 may serve to assist protrusions 117 with retaining conduit section 107 in duct coupler 109. In some embodiments, the ID of body gasket 125 may be tapered to, for example and without limitation, allow for easier insertion of conduit section 107. In some embodiments, the length of overhang section 127 may depend on the distance from locking rib 115 to the position at which conduit section 107 is cut from a longer section of conduit. In some embodiments, the length of body gasket 125 may be selected such that it is long enough to accommodate any anticipated length of overhang section 127.

In some embodiments, duct coupler 109 may further include second row of one or more protrusions 117' positioned to interact with the next locking rib 115 along conduit section 107. Second row of one or more protrusions 117' may, for example, provide additional retention capability to duct coupler 109. Second row of one or more protrusions 117' may also, for example, provide a temporary attachment between conduit section 107 and duct coupler 109 without engaging overhang section 127 within body gasket 125 to assist with makeup of conduit 105. As one of ordinary skill in the art with the benefit of this disclosure will recognize, the number of rows of protrusions may be increased to more than two sets, for instance, in non-limiting embodiments three, four or five sets of protrusions. Further, second row of one or more protrusions 117' may be continuous about the perimeter of the interior of duct coupler body 119, or may be discontinuous and extend only partially about the perimeter of the interior of duct coupler body 119.

In some embodiments, duct coupler 109 may further include an outer locking ring 129 positioned around the outside of duct coupler body 119. Outer locking ring 129 may be positioned to slide along duct coupler body 119 away from cantilevered segments 121 while conduit section 107 is inserted into duct coupler 109. Once conduit section 107 is seated within duct coupler 109, outer locking ring 129 may be slid over cantilevered segments 121 to, for example, prevent them from outwardly flexing and thus prevent protrusions 117 from sliding over locking rib 115. Outer locking ring 129 may thus assist in retaining conduit section 107 within duct coupler 109. In some embodiments, duct coupler body 119 may include a retaining flange 131 to prevent outer locking ring 129 from sliding off of duct coupler body 119. Additionally, some embodiments may also include a locking ridge 133 positioned to retain outer locking ring 129 in the locked position.

Figure 4:
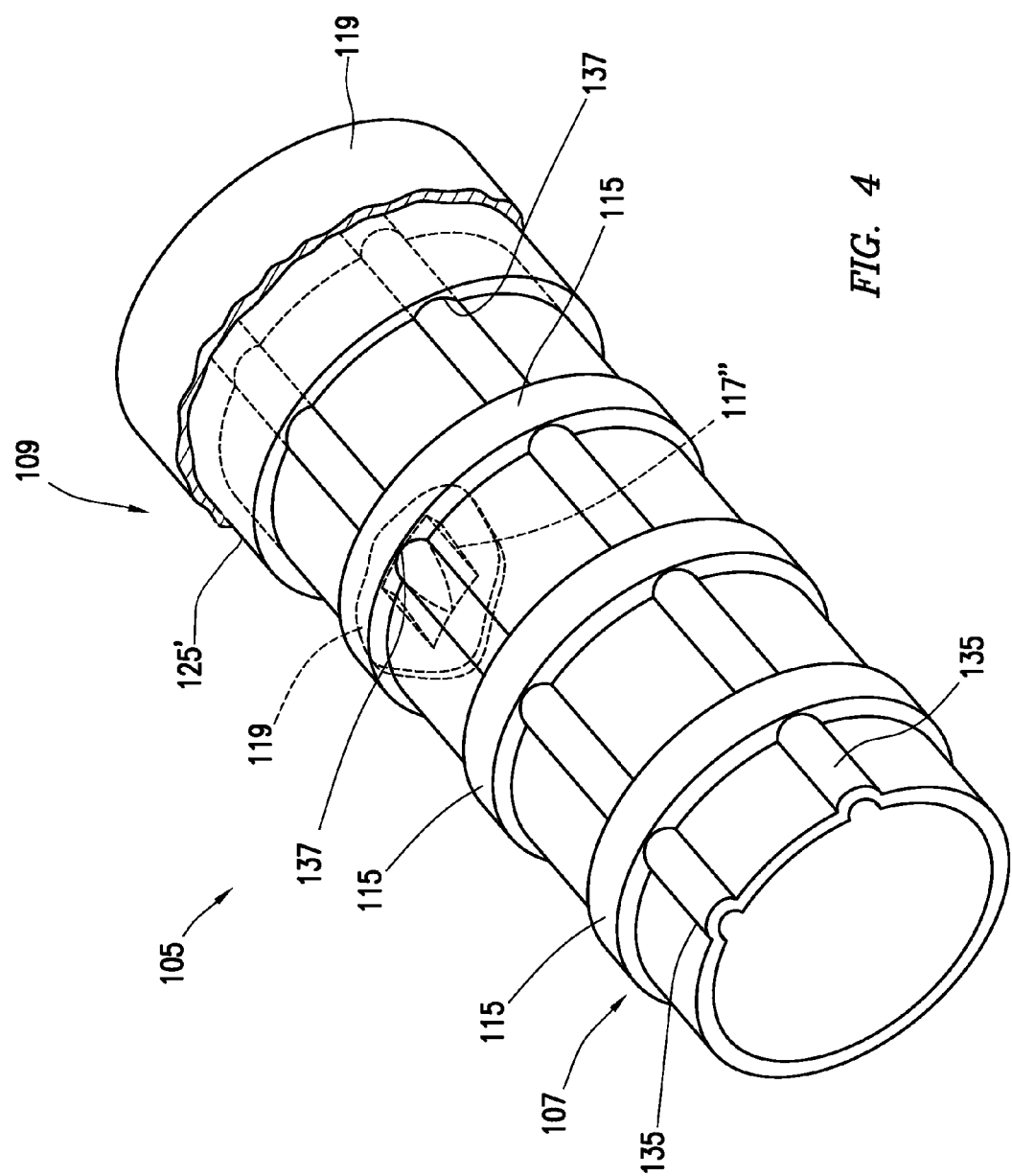
FIG. 4 is a perspective, semi-transparent view of a duct coupler in accordance with embodiments of the present disclosure.

In some embodiments, such as that depicted in FIG. 4, conduit section 107, in addition to locking ribs 115, may include radial orientation ribs 135. In some embodiments, radial orientation ribs 135 may be adapted to support conduit section 107 on an external support (not shown) such as, for example and without limitation, rebar supports. In some embodiments, radial orientation ribs 135 may be used to vent air and/or water away from the prestressing member (not shown) during a grouting operation. Radial orientation ribs 135 may run generally parallel to the length of conduit section 107, and are positioned to interact with corresponding channels 137 formed in protrusions 117" and body gasket 125'. Channels 137 are formed to prevent rotational movement of conduit section 107 within duct coupler 109, which may, for example, improve the structural rigidity of conduit 105 during makeup. In some embodiments, channels 137 formed in body gasket 125' may taper inwards towards the middle of body gasket 125' to, for example, assist with forming the seal around the contour of radial orientation rib 135.

In some embodiments, duct coupler body 119 and outer locking ring 129 are formed from an at least slightly elastic material such as plastic, fiberglass, or hard rubber. Duct coupler body 119 may be formed, for example and without limitation, by molding, milling, turning, etc. In some embodiments, body gasket 125 is formed from an elastic material such as rubber. Body gasket 125 may be molded directly to duct coupler body 119 or may be formed separately and then later attached.

Although depicted as having two rows of protrusions 117, 117', one having ordinary skill in the art with the benefit of this disclosure will understand that any number and arrangement of protrusions may be provided within the scope of this disclosure. Although only one particular arrangement of locking ribs 115 and radial orientation ribs 135 is discussed with regard to the arrangement of protrusions 117, 117' of duct coupler 109, one having ordinary skill in the art with the benefit of this disclosure will understand that conduit section 107 may have other arrangements, and duct coupler 109 may be reconfigured to attach thereto within the scope of this disclosure.

Furthermore, one having ordinary skill in the art with the benefit of this disclosure will understand that the placement, shape, and arrangement of locking ribs 115 may be varied without deviating from the scope of this disclosure.

Also, although described in terms of a post-tensioned concrete member, one having ordinary skill in the art with the benefit of this disclosure will understand that the duct coupler described in this disclosure may be used in any conduit setup. Furthermore, although the conduit section is illustrated as having a repeating pattern of locking ribs, one having ordinary skill in the art with the benefit of this disclosure will understand that a conduit section containing only one locking rib may be used without deviating from the scope of this disclosure.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A duct coupler for joining two segments of conduit, the duct coupler comprising:
    a coupler body, the coupler body being tubular and having an inner diameter corresponding to an outer diameter of a section of conduit measured at an annular locking rib positioned on the section of conduit;
    one or more protrusions formed on an interior surface of the coupler body, the one or more protrusions positioned to engage with at least one said annular locking rib to retain the section of conduit within the coupler body, the coupler body including a cantilevered segment adapted to allow at least one protrusion of the one or more protrusions to move radially outward as the section of conduit is inserted into the coupler body, and adapted to force the at least one protrusion radially inward after the at least one annular locking rib passes the at least one protrusion;
    an outer lock ring, the outer lock ring slidable around an outer surface of the coupler body, and positioned to prevent the cantilevered segment from moving radially outward while the outer lock ring is in a locked position, the coupler body further including a retention flange adapted to retain the outer lock ring on the coupler body and a locking ridge positioned to retain the outer lock ring in the locked position between the locking ridge and the retention flange; and
    a body gasket, the body gasket being tubular and positioned on the interior surface of the coupler body, the body gasket positioned to form a seal between an inner wall of the coupler body and an outer wall of the section of conduit.

2. The duct coupler of claim 1, wherein the at least one protrusion is wedge shaped.

3. The duct coupler of claim 1, wherein the number of protrusions is one and the one protrusion extends around a perimeter of the interior surface of the coupler body.

4. The duct coupler of claim 1, wherein the section of conduit further comprises a radial orientation rib, and the at least one protrusion comprises a corresponding channel positioned to engage the radial orientation rib and prevent rotation of the duct coupler body with respect to the section of conduit.

5. The duct coupler of claim 1, wherein the number of protrusions is more than one and the more than one protrusions form a row around the perimeter of the interior surface of the coupler body.

6. The duct coupler of claim 5, comprising a second row of protrusions located on the interior surface of the coupler body.

7. The duct coupler of claim 1, wherein the body gasket is formed from an elastic material and an inner diameter is selected such that the section of conduit is at least partially press-fit into an interior of the body gasket.

8. The duct coupler of claim 7, wherein the inner diameter is smaller at the middle of the body gasket than the inner diameter at an end of the body gasket.

9. The duct coupler of claim 1, wherein the section of conduit further comprises a radial orientation rib, and the body gasket includes a corresponding channel positioned to engage the radial orientation rib and prevent rotation of the duct coupler body with respect to the section of conduit.

10. The duct coupler of claim 9, wherein the channel formed in the body gasket tapers inward toward the middle of the body gasket.

11. A conduit for use in a post-tensioned concrete member, the conduit comprising:
 a first and second conduit section, the first and second conduit sections being tubular and having a series of annular locking ribs positioned along a length of each conduit section, the annular locking ribs having a diameter greater than a diameter of the conduit section; and
 a duct coupler positioned to couple the first conduit section to the second conduit section, the duct coupler including:
 a coupler body, the coupler body being tubular and having an inner diameter equal to or greater than the diameter of the annular locking ribs;
 one or more protrusions formed on an interior surface of the coupler body, the one or more protrusions positioned to engage with at least one said annular locking rib to retain the first and second conduit sections within the coupler body, the coupler body including a cantilevered segment adapted to allow at least one protrusion of the one or more protrusions to move radially outward as each said conduit section is inserted into the coupler body, and adapted to force the at least one protrusion radially inward after the at least one annular locking rib passes the at least one protrusion;
 an outer lock ring, the outer lock ring slidable around an outer surface of the coupler body, and positioned to prevent the cantilevered segment from moving radially outward while the outer lock ring is in a locked position, the coupler body further including a retention flange adapted to retain the outer lock ring on the coupler body and a locking ridge positioned to retain the outer lock ring in the locked position between the locking ridge and the retention flange; and
 a body gasket, the body gasket being tubular and positioned on the interior surface of the coupler body, the body gasket positioned to form a seal between the first and second conduit sections.

12. The conduit of claim 11, wherein the at least one protrusion is wedge shaped.

13. The conduit of claim 11, wherein the first and second conduit sections each further comprise a radial orientation rib, and the body gasket includes a corresponding channel positioned to engage the radial orientation rib and prevent rotation of the first conduit section relative to the second conduit section.

14. The conduit of claim 11, wherein each said conduit section is piping or duct.

15. The conduit of claim 11, wherein the number of protrusions is one and the one protrusion extends around a perimeter of the interior surface of the coupler body.

16. The conduit of claim 11, wherein the number of protrusions is more than one and the more than one protrusions form a row around a perimeter of the interior surface of the coupler body.

17. The conduit of claim 16, comprising a second row of protrusions located on the interior surface of the coupler body.

* * * * *